United States Patent Office
2,894,963
Patented July 14, 1959

2,894,963

9,11-DIHALOGENO-4-PREGNENES AND 1,4-PREGNADIENES

David H. Gould, Leonia, Hans Reimann, Bloomfield, and Lawrence E. Finckenor, Lyndhurst, N.J., assignors to Schering Corporation, Bloomfield, N.J., a corporation of New Jersey No Drawing. Application June 20, 1958
Serial No. 743,492

21 Claims. (Cl. 260—397.45)

This invention relates to novel and therapeutically useful $\Delta^4$-pregnenes and $\Delta^{1,4}$-pregnadienes and to methods for their manufacture. In particular, this invention relates to 3,20-diketo-17$\alpha$,21-dihydroxy-9$\alpha$,11$\beta$-dihalogeno-4-pregnenes, the corresponding 1,4-pregnadienes and 21-esters thereof; said compounds being valuable anti-inflammatory agents.

The new compounds prepared by the novel process of our invention described herein are members of the group consisting of pregnenes (I) and pregnadienes (II) of the following formulae:

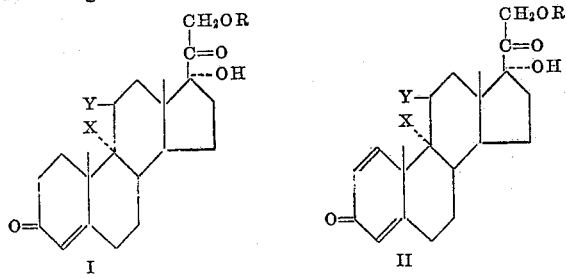

wherein X is a halogen having an atomic weight greater than 19; Y is a halogen having an atomic weight less than 126 and being at least as electronegative as X, and R is a member of the group consisting of hydrogen and acid radicals of the group consisting of lower alkanoic acids, dibasic organic acids having up to eight carbon atoms, and pharmaceutically acceptable polybasic inorganic acids. Also contemplated as falling within our invention are the 2-methyl, 6$\alpha$-methyl, 16($\alpha$ or $\beta$)-lower alkyl, and 16$\alpha$-OR' analogs of the foregoing wherein R' is a member of the group consisting of hydrogen and lower alkanoyl; and when R' is hydrogen, the 16$\alpha$,17$\alpha$-acetonide, thereof.

Illustrative of the 21-esters contemplated above are lower alkanoates such as acetate, propionate, tertiary-butyl acetate, cyclopentylpropionate. Others prepared from dibasic organic acids are the succinate, phthalate, and the sulfobenzoates; and those from polybasic inorganic acids are sulfate, phosphate and the like.

As stated heretofore, the 11$\beta$-halogen present in a compound of Formulae I or II, or an analog thereof, must be at least as electronegative as the halogen present in the 9$\alpha$-position; fluorine being the most electronegative halogen, and iodine the least electronegative. Thus, a pregnene of pregnadiene of our invention containing a 9$\alpha$-chloro-group may possess an 11$\beta$-chloro or an 11$\beta$-fluoro group but cannot contain an 11$\beta$-iodo or 11$\beta$-bromo group. This artificial restriction is imposed in view of the limitation of the manufacturing process. Typical compounds of Formulae I and II and their analogs are: 9$\alpha$,11$\beta$-dichloro-4-pregnene-17$\alpha$,21-diol-3,20-dione, 9$\alpha$-bromo-11$\beta$-fluoro-4-pregnene-17$\alpha$,21-diol-3,20-dione, 9$\alpha$,11$\beta$-dichloro-4-pregnene-16$\alpha$,17$\alpha$,21-triol-3,20-dione, 9$\alpha$,11$\beta$-dichloro-16$\alpha$-methyl-4-pregnene-17$\alpha$,21-diol-3,20-dione, 2-methyl-9$\alpha$-chloro-11$\beta$-fluoro-4-pregnene-17$\alpha$,21-diol-3,20-dione 21-acetate, 9$\alpha$-bromo-11$\beta$-chloro-1,4-pregnadiene-17$\alpha$,21-diol-3,20-dione and the 21-acetate thereof, 9$\alpha$,11$\beta$-dichloro-1,4-pregnadiene-17$\alpha$,21-diol-3,20-dione, the 21-acetate, 21-carbethoxylate, and the 21-monosodium-o-sulfobenzoate thereof, 9$\alpha$,11$\beta$-dichloro-16$\beta$-methyl-1,4-pregnadiene-17$\alpha$,21-diol-3,20-dione, 9$\alpha$,11$\beta$-dichloro-16$\alpha$-methyl-1,4-pregnadiene-17$\alpha$,21-diol-3,20-dione, and 9$\alpha$-chloro-11$\beta$-fluoro-6$\alpha$-methyl-1,4-pregnadiene-17$\alpha$,21-diol-3,20-dione 2-acetate.

All the compounds of our invention are valuable therapeutic agents as outlined below. The preferred embodiment of our invention, however, is 9$\alpha$,11$\beta$-dichloro-1,4-pregnadiene-17$\alpha$,21-diol-3,20-dione, and analogs, and 21-esters thereof.

The new 9,11-dihalogeno compounds of our invention falling within Formulae I and II are strong anti-inflammatory agents which, advantageously, are not salt-retaining. That these compounds possess anti-inflammatory activity is in itself surprising in view of the fact that these compounds are dihalogeno derivatives of Reichstein's Compound S, an adrenal steroid of almost negligible pharmacological activity, and in view of the fact that never before has a steroid compound devoid of an oxygen at C-11 been found to possess any significant anti-inflammatory activity. Moreover, that our compounds are not salt-retaining is contrary to what might be expected in view of previous indications wherein the inclusion of a 9$\alpha$-halogen in a steroid molecule is usually synonymous with imparting salt activity to the compound. Thus, in the case of prednisone and prednisolone, both widely used anti-arthritic steroids with negligible salt-retaining properties, the introduction of a 9$\alpha$-fluoromoiety causes these compounds to become so salt-retaining as to render the 9$\alpha$-fluoro-analog useless for anti-inflammatory therapy via oral or parenteral routes.

In treating anti-inflammatory disorders, our dihalogeno compounds exhibit greater activity and a longer duration of activity than prednisolone acetate while advantageously exhibiting negligible salt-retention. For example, 9$\alpha$,-11$\beta$-dichloro-17$\alpha$,21-dihydroxy-1,4-pregnadiene-3,20-dione is 20 times as active as prednisolone 21-acetate when measured by the granuloma pouch test. Moreover, tests of the duration of eosinopenic activity reveal that, at equal doses, the 21-acetate of the aforementioned dichloro-pregnadiene maintains 80% of its initial activity two and a half times as long as does prednisolone acetate.

Our compounds are particularly valuable in human therapy when administered topically for the alleviation of inflammations and burns, and also in the treatment of atopic dermatitis (allergic eczema, food eczema, infantile eczema, nummular eczema, eczamatoid dermatitis, pruritis with lichenification, disseminated neurodermatitis), contact dermatitis due to plants (rhus poisoning) and other substances. When administered topically in humans, our compounds exhibit a greatly enhanced activity over other topical administerable steroids, and at the same time produce no systemic effects. This is unexpected of a halogen-containing-steroid in view of the systemic effects suffered by patients using ointments containing compounds such as 9$\alpha$-fluorohydrocortisone. Our compounds have been found to be topically effective at smaller doses than used heretofore by other steroids, and, moreover, have been found to be effective in cases which do not respond to other corticosteroids. Topical preparations containing from 0.1 to 0.3% of one of our compounds are advantageously employed.

When administered intravenously in humans, our dihalogeno compounds elicit the effects commonly associated with corticoids. Thus, they are valuable therapeutics for such use in intravenous therapy as (1) acute adrenal crises, (2) acute surgical emergencies and (3) acute stressful situations. The parenteral compositions may contain our therapeutically active compounds dissolved or suspended in such non-toxic liquid vehicles as diethylacetamide and saline or dextrose and saline. The dose may vary from 5 to 25 milligrams depending upon the severity of the crises, and may be administered in one injection or by a slow-drip.

Our halogenated pregnenes and pregnadienes are also valuable therapeutic agents for veterinary use, particularly in smaller animals. For the treatment of ailments arising from inflammatory disorders in small animals, our compounds exhibit an activity several times that of prednisone and prednisolone; are much less catabolic than the latter compounds; and at the same time exhibit little or no salt retention. All the hormonal effects such as thymus involution, liver weight increase, depression of circulating lymphocytes, and increase in polymorphonuclear leucocytes present in other anti-inflammatory steroids, such as cortisone, hydrocortisone, prednisone and prednisolone acetate, are present in our dihalogeno derivatives if taken for long periods of time. However, the greatly enhanced activity of our compounds allows the use of such small doses, that these hormonal side effects are greatly minimized in our halogenated steroids. This combination of greatly enhanced anti-inflammatory activity, coupled with a minimum of salt retention and negligible undesirable hormonal side effects, renders our dihalogeno-pregnenes and pregnadienes drugs of choice for use in dogs and other small animals for the alleviation of inflammatory conditions involving the joints and accessory tissues; certain skin conditions, such as non-specific dermatitis and summer or dry eczema, alleviation of stress conditions when used pre- or postoperatively, and as supportive therapy in traumatic shock. In animals, our compounds may be administered via all routes, i.e. orally, topically, subcutaneously, or intravenously. The dosage requirements are much less than those for other anti-inflammatory corticosteroids such as prednisone or prednisolone. Suggested dosages for small animals are in the range of 2–5 milligrams daily tapering down to a maintenance daily dose of 0.5–2.0 milligrams.

Our compounds (when used for dogs, for example) are administered orally in the form of tablets containing from 0.5 to 1 mgm. per tablet mixed with a solid carrier containing one or more of the usual excipients such as starch, sugar, gums, soaps, clays and the like. Where parenteral administration is indicated in animal treatment, subcutaneous or intramuscular injection of the substance dissolved or suspended in a suitable non-toxic liquid vehicle is preferred. Parenteral compositions preferably contain a 21-ester of the dihalogeno-pregnene or pregnadiene. Topical preparations containing 0.1–3% of active ingredient are advantageously employed.

Our dihalogeno compounds are prepared by reacting the corresponding 9,11-dehydro-4-pregnene or 9,11-dehydro-1,4-pregnadiene with a halogen donor. Some of the 9,11-dehydro starting compounds are known, such as the 21-acetate of 4,9(11)-pregnadiene-17α,21-diol-3,20-dione, the 1-dehydro-analog thereof, and the 21-acetate of 16α-acetoxy-4,9(11)-pregnadiene-17α,21-diol-3,20 - dione. Other 4,9(11)-pregnadienes may be prepared from the corresponding 11-hydroxylated 4-pregnenes by the action of reagents such as methanesulfonyl chloride in the presence of pyridine, phosphorous oxychloride in pyridine, or concentrated aqueous hydrochloric acid in refluxing benzene-ether. In the same way, 1,4,9(11)-pregnatrienes starting compounds may be prepared from the corresponding 11-hydroxy-1,4-pregnadienes.

Halogen donors which may be used in our process are: (1) molecular halogens such as chlorine or bromine, (2) molecular halogen donors such as the addition compounds pyridinium bromide perbromide, dioxane dibromide, iodobenzene dichloride and p-iodotoluene dichloride, (3) a mixed halogen molecule such as iodine monochloride, (4) a mixture of reagents comprising a positive halogen donor such as a molecular halogen or a compound such as N-chlorosuccinimide, N-bromoacetamide, dimethyl-N,N-dibromohydantoin, and N-iodosuccinimide, together with a halogen ion having an electronegativity equal to or greater than that of the above-mentioned positive halogen donor. Examples of such mixtures are lithium chloride and N-chlorosuccinimide, lithium chloride and chlorine, potassium fluoride and N-bromoacetamide, hydrogen bromide and N-bromoacetamide, potassium fluoride and N-iodosuccinimide, hydrogen chloride, lithium chloride and N-chlorosuccinimide, and the like. Whenever a mixture of halogen donor reagents are present in a reaction mixture, the more electronegative halogen attacks the 11-position. Thus, a compound reacted with potassium fluoride and N-iodosuccinimide will yield 9α-iodo-11β-fluoro-derivatives.

The molecular halogens, molecular halogen donors, or mixed halogens, such as chlorine, bromine, iodobenzene dichloride, iodine monochloride, employed in our process may be used in their commercially available form, in which case they are added directly to the reaction mixture either alone or in a suitable solvent such as acetic acid or tetrahydrofuran. Alternatively, the desired halogen or halogen mixture may be generated in situ by the addition of 0.9–1.2 equivalents, based on the amount of steroid, of a positive halogen donor, such as N-bromosuccinimide, to a reaction mixture containing a halogen ion of greater or equal electronegativity than the added halogen. This halogen anion may be supplied by a hydrohalic acid or a suitable salt such as sodium bromide, lithium chloride, potassium fluoride, or by mixtures of an acid and a corresponding salt. Whenever an acid is the source of halogen-anion, approximately theoretical quantities are generally used, whereas a salt-halogen-anion source may be present in large excess. Such an excess of anion is frequently useful when an increased yield or a purer compound is desired in a given reaction. A halogen-anion source may be used in reactions employing molecular halogens in which case an anion corresponding to the molecular halogen is used. A halogen-anion source may also be used in reactions which employ a mixed halogen, in which case a source of the more electronegative anion is used, i.e. a suitable chloride salt, or hydrochloric acid would be used in a reaction employing iodine monochloride.

It is apparent from the above, that there are a number of different ways in which the same compound may be prepared. For example, a 9α,11β-dichloro-compound may be prepared by utilizing such reagents and combinations as (1) chlorine and lithium chloride in acetic acid, (2) N-chloro succinimide and lithium chloride in glacial acetic acid, (3) sodium chloride and N-chlorosuccinimide in glacial acetic acid together with hydrogen chloride in tetrahydrofuran, (4) chlorine alone in glacial acetic acid, (5) chlorine and hydrogen chloride in glacial acetic acid, and (6) iodobenzene dichloride in acetic acid. The choice of solvent in each reaction is naturally determined by the solubility of the reagents in the process.

Our process, whereby a 9,11-dehydrosteroid is converted to a 9α,11β-dihalogeno-derivative is generally carried out in the presence of a suitable solvent at temperatures ranging from 5° C. to 50° C. for a period of from one-half hour to 24 hours, depending on the reagents involved. The preferred reaction conditions usually involve the use of glacial acetic acid as the sole or major solvent, with the reaction being carried out at room temperature for a period of approximately two hours.

Although glacial acetic acid is generally the preferred solvent, other solvents may be used in our dihalogenation process either alone or in combination with acetic acid. Solvents which may be employed include lower aliphatic acids such as acetic and diethylacetic, halogenated hydrocarbons such as methylene chloride and chloroform, saturated ethers such as tetrahydrofuran and dioxane, other inert solvents such as dimethylsulfoxide; as well as suitable mixtures of these solvents.

When preparing the di-halogen-derivatives the reactive hydroxyl group at C-21 is preferably protected by prior esterification. Thus, the 21-esters of the 4,9(11)-pregnadienes or 1,4,9(11)-pregnatrienes are the preferred starting compounds. The 9α,11β-dihalogeno-21-esters resulting from the process outlined above may then be conveniently saponified to the corresponding alcohols either chemically by the use of dilute acid or base, or microbiologically by procedures analogous to that described in South African Patent No. 3,462/55. Alternatively, a dihalogeno free alcohol prepared by our process, may be converted to an ester by the usual methods.

The compounds of our invention may be used either in the form of the free alcohol or as the ester derivatives of the 21-hydroxyl group mentioned heretofore and including such as the acetate, propionate, isovalerate, enanthate, cyclopentylpropionate and tertiary butyl acetate. Other valuable 21-esters are the carbethoxylate, phenoxyacetate and substituted phenoxyacetates such as the 4-choloro-, 2,4-dichloro, 4-bromo-, 4-methyl-, 4-tert.-butyl-, 2,4,5-trichloro-, and 4-methoxyphenoxyacetates. The furoate and substituted furoates are also valuable esters.

The dihalogeno-corticosteroids of our invention may also be used in the form of their water soluble derivatives, such as monosodium succinates, phthalates, sulfates, phosphates, glycinate salts, gluconates, monosodiumsulfobenzoates, and the like.

The following examples are illustrative of the procedures employed in preparing the compounds of this invention but are not to be construed as limiting the scope thereof, the scope of our invention being limited only by the appended claims.

EXAMPLE 1

*9α - bromo - 11β - chloro - 1,4 - pregnadiene - 17α,21-diol-3,20-dione 21-acetate*

A solution of 1.0 g. of 1,4,9(11)-pregnatriene-17α,21-diol-3,20-dione 21-acetate in 40 ml. of glacial acetic acid is treated with 0.395 g. of N-bromo-acetamide, followed by 0.104 g. of anhydrous hydrogen chloride dissolved in 1 ml. of tetrahydrofuran. The reaction mixture is stirred at room temperature for 3 hours, and poured into ice-water. The mixture is filtered and precipitate is washed with water yielding 1.23 g. of the crude substance of this example. Recrystallization from acetone-hexane affords pure 9α - bromo - 11β - chloro - 1,4 - pregnadiene - 17α, 21-diol-3,20-dione 21-acetate; M.P. 190–195° C. (dec.); $[\alpha]_D^{20}$ +172° (ioxane)

$\lambda_{max}^{MeOH}$ 239 mμ, ε=14,500

*Analysis.*—Calcd. for $C_{23}H_{28}O_5ClBr$: C, 55.26; H, 5.65; Cl, 7.09; Br, 15.99. Found: C, 55.28; H, 5.34; Cl, 7.01; Br, 15.60.

EXAMPLE 2

*9α,11β - dichloro - 1,4 - pregnadiene - 17α,21 - diol - 3,20-dione 21-acetate*

A solution of 1.0 g. of 1,4,9(11)-pregnatriene-17α,21-diol-3,20-dione 21-acetate and 5.0 g. of lithium chloride in 40 ml. of glacial acetic acid is treated with 0.410 g. of N-chlorosuccinimide, followed by 0.104 g. of anhydrous hydrogen chloride dissolved in 2.5 ml. of tetrahydrofuran. The reaction mixture is stirred for 2 hours and poured into ice-water. The crude product is filtered and washed with water to give 1.12 g. of solid material, which is recrystallized from acetone-hexane to give substantially pure 9α,11β-dichloro-1,4-pregnadiene-17α,21-diol-3,20-dione 21-acetate; M.P. 246–253° C. (dec.); $[\alpha]_D^{25}$ +162° (dioxane)

$\lambda_{max}^{MeOH}$ 237 mμ, ε=15,000

*Analysis.*—Calcd. for $C_{23}H_{28}O_5Cl_2$: C, 60.66; H, 6.20; Cl, 15.57. Found: C, 60.24; H, 6.14; Cl, 15.99.

The compound of this example is alternatively prepared by treating a solution of 1.0 g. of 1,4,9(11)-pregnatriene-17α,21-diol-3,20-dione 21-acetate and 5.0 g. of lithium chloride in 40 ml. of glacial acetic acid with a solution of 203 mg. of anhydrous chlorine in 5 ml. of tetrahydrofuran, followed by stirring at room temperature for 3 hours; work-up and physical constants as above.

EXAMPLE 3

*9α - bromo - 11β - fluoro - 1,4 - pregnadiene - 17α,21-diol-3,20-dione 21-acetate*

To a solution of 1.0 g. of 1,4,9(11)-pregnatriene-17α, 21-diol-3,20-dione 21-acetate and 6.0 g. of potassium fluoride in a mixture of 40 ml. of diethyl acetic acid and 20 ml. of tetrahydrofuran is added 0.395 g. of N-bromoacetamide. The reaction mixture is stirred at room temperature for 20 hours, poured into ice-water, and extracted with methylene chloride. The extracts are washed in turn with sodium bicarbonate solution and water, followed by drying over anhydrous magnesium sulfate. The solvent is then evaporated to an oily residue which, on trituration with ether, gives 1.1 g. of the crude product of this example. Chromatography on silica gel (100:1) and elution with 50% ether-hexane furnishes 9α-bromo-11β-fluoro-1,4-pregnadiene-17α,21-diol-3,20-dione 21-acetate which is recrystallized from acetone-hexane $\lambda_{max}^{MeOH}$ 239 mμ

The compound of this example is alternatively prepared by treating 1,4,9(11)-pregnatriene-17α,21-diol-3,20-dione 21-acetate with N-bromoacetamide in diethylacetic acid saturated with anhydrous hydrogen fluoride isolating and purifying the 9α-bromo-11β-fluoro-pregnadiene so obtained in the same manner as described above.

EXAMPLE 4

*1,4,9(11)-pregnatriene-17α,21-diol-3,20-dione*

A solution of 2.0 g. of 1,4,9(11)-pregnatriene-17α,21-diol-3,20-dione 21-acetate in 100 ml. of a 3:1 methanol-chloroform mixture is chilled in ice, to which is added dropwise 52 ml. of 0.1 N sodium hydroxide solution (1 equivalent). The reaction mixture is stirred at 0° C. for 10 minutes, then diluted with water and extracted with methylene chloride. Evaporation of the solvent and crystallization of the residue from acetone-hexane affords 1,4,9(11)-pregnatriene-17α,21-diol-3,20-dione, M.P. 220–228° C. (dec.)

$\lambda_{max}^{MeOH}$ 238 mμ, ε=15,500

*Analysis.*—Calcd. for $C_{21}H_{26}O_4$: C, 73.66; H, 7.66. Found: C, 73.58; H, 7.54.

EXAMPLE 5

*9α,11β-dichloro-1,4-pregnadiene-17α,21-diol-3,20-dione*

One gram of the compound of Example 4 is treated with chlorine gas and lithium chloride, in glacial acetic acid solution, as described in Example 2. The resulting product is crystallized from acetone to give 9α,11β-dichloro-1,4-pregnadiene-17α,21-diol-3,20-dione; M.P. 238–241° C. (dec.); $[\alpha]_D^{20}$ +134° (pyridine)

$\lambda_{max}^{MeOH}$ 237 mμ, ε=15,400

*Analysis.*—Calcd. for $C_{21}H_{26}O_4Cl_2$: C, 61.02; H, 6.34; Cl, 17.15. Found: C, 61.26; H, 6.30; Cl, 16.66.

Alternatively the compound of this example is prepared by hydrolyzing the product of Example 2 according to the saponification procedure of Example 4. The crude product is crystallized from acetone; constants as above.

EXAMPLE 6

*9α,11β - dichloro - 1,4 - pregnadiene - 17α,21 - diol - 3,20-dione 21-propionate*

To 1.0 g. of 9α,11β-dhcoloro-1,4-pregnadiene-17α,21-diol-3,20-dione prepared as in Example 5 there is added 1 ml. of propionic anhydride in 10 ml. of dry pyridine. The reaction mixture is left at room temperature for 3 hours, then is poured with stirring into ice-water. The resulting precipitate is filtered, washed with water and crystallized from acetone-hexane to give 9α,11β-dichloro-1,4-pregnadiene-17α,21-diol-3,20-dione 21-propionate, $\lambda_{max}^{MeOH}$ 237 mμ

EXAMPLE 7

*9α,11β - dichloro - 1,4 - prgenadiene - 17α,12 - diol-3,20-dione 21-carbethoxylate*

One gram of 9α,11β-dichloro-1,4-pregnadiene-17α,21-diol-3,20-dione prepared as in Example 5 is reacted with 25 ml. of dry pyridine and 1 ml. of ethyl chlorocarbonate in the manner described in Example 6 to yield 9α,11β-dichloro - 1,4 - pregnadiene - 17α,21 - diol - 3,20 - dione 21-carbethoxylate, M.P. 238–242° C. (dec.); [α]$_D^{20}$ +149° (dioxane);

$\lambda_{max}^{MeOH}$ 237 mμ, ε=14,800

*Analysis.*—Calcd. for $C_{29}H_{30}O_6Cl_2$: C, 59.38; H, 6.23; Cl, 14.61. Found: C, 59.61; H, 6.29; Cl, 14.71.

EXAMPLE 8

*9α,11β - dichloro - 1,4 - pregnadiene - 17α,21 - diol-3,20-dione 21-sodium o-sulfobenzoate*

One gram of 9α,11β-dichloro-1,4-pregnadiene-17α,21-diol-3,20-dione, prepared as in Example 5, is dissolved in 25 ml. dry pyridine, then 445 mgm. o-sulfobenzoic anhydride is added. The reaction mixture is stirred overnight at room temperature, then poured into ice-water, acidified with cold dilute sulfuric acid, and extracted with methylene chloride. The combined organic extracts are evaporated to a residue which, after being dissolved in aqueous methanol, is brought to neutrality with dilute aqueous sodium hydroxide. The neutral solution is then distilled to dryness, and the resultant residue extracted with water. The aqueous extracts, in turn, are concentrated to a residue which is crystallized from acetonitrile-water to yield 9α,11β-dichloro-1,4-pregnadiene-17α,21-diol-3,20-dione 21-sodium o-sulfobenzoate, M.P. 252–254° C. (dec.);

$\lambda_{max}^{MeOH}$ 235 mμ, ε=15,000

EXAMPLE 9

*9α - bromo - 11β - fluoro - 1,4 - pregnadiene - 17α,21-diol-3,20-dione*

One gram of the 1,4,9(11)-pregnatriene of Example 4 is reacted as described in Example 3 with N-bromoacetamide and potassium fluoride in diethylacetic acid-tetrahydrofuran solution. Chromatography of the crude product on silica gel affords, on elution with ether, and crystallization from ethyl acetate-hexane, 9α-bromo-11β-fluoro-1,4-pregnadiene-17α,21-diol-3,20-dione;

$\lambda_{max}^{MeOH}$ 239 mμ

EXAMPLE 10

*9α - bromo - 11β - fluoro - 1,4 - pregnadiene - 17α,21-diol-3,20-dione 21-diethyl acetate*

500 mg. of 9α-bromo-11β-fluoro-1,4-pregnadiene-17α,21-diol-3,20-dione prepared as described in Example 9 is dissolved in 15 ml. of dry pyridine, chilled to 0° C., and 250 mg. of diethylacetyl chloride is added. The reaction mixture is allowed to stand at room temperature for 2 hours, then poured into ice cold dilute sulfuric acid. The resultant crude precipitate is filtered, washed with water, and recrystallized from methanol-benzene to give 9α-bromo-11β-fluoro-1,4-pregnadiene-17α,21-diol-3,20-dione 21-diethylacetate;

$\lambda_{max}^{MeOH}$ 239 mμ

EXAMPLE 11

*9α - chloro - 11β - fluoro - 1,4 - pregnadiene - 17α,21-diol-13,20-dione 21-acetate*

One gram of 1,4,9(11)-pregnatriene-17α,21-diol-3,20-dione 21-acetate is reacted wtih potassium fluoride in diethylacetic acid-tetrahydrofuran in the manner of Example 3, except that 400 mg. of N-chlorosuccinimide is used instead of the N-bromoacetamide. The crude precipitate is chromatographed on silica gel. Elution with 50% hexane-ether, followed by crystallization from acetone, yields 9α-chloro-11β-fluoro-1,4-pregnadiene-17α,21-diol-3,20-dione 21-acetate;

$\lambda_{max}^{MeOH}$ 237 mμ

EXAMPLE 12

*9α,11β - dibromo - 1,4 - pregnadiene - 17α,21 - diol-3,20--dione 21-acetate*

To a solution of 1.0 g. of 1,4,9(11)-pregnatriene-17α, 21-diol-3,20-dione 21-acetate in 40 ml. of methylene chloride there is added dropwise at 0° C. a solution of 420 mg. of bromine in 5 ml. of methylene chloride. The reaction mixture is stirred at 0° C. for 1 hour, then diluted with methylene chloride, washed with water, dried over anhydrous magnesium sulfate, and concentrated in vacuo. The residual oil is dissolved in acetone, treated with decolorizing carbon and crystallized from acetone-hexane, yielding 9α,11β - dibromo - 1,4 - pregnadiene-17α,21-diol-3,20-dione 21-acetate; M.P. 142–146° C. (dec.); [α]$_D^{20}$ +185° (dioxane);

$\lambda_{max}^{MeOH}$ 240 mμ, ε=14,200

*Analysis.*—Calcd. for $C_{23}H_{28}O_5Br_2$: C, 50.75; H, 5.18; Br, 29.37. Found: C, 51.00; H, 5.04; Br, 28.82.

The compound of this example is also obtained by treating a glacial acetic acid solution of 1,4,9(11)-pregnatriene-17α,21-diol-3,20-dione 21-acetate with N-bromoacetamide and hydrogen bromide.

EXAMPLE 13

*9α - iodo - 11β - chloro - 1,4 - pregnadiene - 17α,21-diol-3,20-dione 21-acetate*

A solution of 1.0 g. of 1,4,9(11)-pregnatriene-17α,21-diol-3,20-dione 21-acetate in 40 ml. of tetrahydrofuran is chilled to 0° C., 3 drops of perchloric acid then are added followed by the dropwise addition of a solution of 450 mg. of iodine monochloride in 5 ml. of tetrahydrofuran. The reaction mixture is stirred at room temperature for 6 hours, then poured into ice-water, and extracted with methylene chloride. The organic extracts are treated with decolorizing carbon and concentrated in vacuo. The resultant residue is crystallized from acetone-hexane to give 9α-iodo-11β-chloro-1,4-pregnadiene-17α, 21-diol-3,20-dione 21-acetate;

$\lambda_{max}^{MeOH}$ 240 mμ

The compound of this example is also prepared by the action of N-iodosuccinimide and lithium chloride, in acetic acid, on 1,4,9(11)-pregnatriene-17α,21-diol-3,20-dione 21-acetate.

EXAMPLE 14

*9α - iodo - 11β - fluoro - 1,4 - pregnadiene - 17α,21 - diol-3,20-dione 21-acetate*

To a solution of 500 mg. of 1,4,9(11)-pregnatriene-17α,21-diol-3,20-dione 21-acetate and 3.0 g. of potassium fluoride in 40 ml. of dimethylsulfoxide there is added 300 mg. of N-iodosuccinimide. The reaction mixture is stirred at room temperature for 16 hours, poured into ice-water, and extracted with methylene chloride. The organic extracts are then treated with decolorizing carbon, and concentrated in vacuo. The resultant residue is chromatographed on silica gel, the fraction eluted with 50% ether-hexane yielding 9α-iodo-11β-fluoro-1,4-pregnadiene-17α,21-diol-3,20-dione 21-acetate;

$$\lambda_{max}^{MeOH}\ 240\ m\mu$$

EXAMPLE 15

*9α,11β - dichloro - 4 - pregnene - 17α,21 - diol - 3,20-dione 21-acetate*

A solution of 1.0 g. of 4,9(11)-pregnadiene-17α,21-diol-3,20-dione 21-acetate and 5.0 g. of lithium chloride in 40 ml. of glacial acetic acid is treated with a solution of 200 mg. of chlorine gas in 3 ml. of tetrahydrofuran in the manner of Example 2. Crystallization of the crude product from acetone-hexane yields 9α,11β, dichloro-4-pregnene-17α,21-diol-3,20-dione 21-acetate;

$$\lambda_{max}^{MeOH}\ 240\ m\mu$$

The corresponding 21-alcohol is prepared from the 21-acetate of this example in the manner of Example 4, yielding 9α,11β-dichloro-4-pregnene-17α,21-diol-3,20-dione.

EXAMPLE 16

*9α-bromo-11β-fluoro-4-pregnene-17α,21-diol-3,20-dione 21-acetate*

A solution of 1.0 g. of 4,9(11)-pregnadiene-17α,21-diol-3,20-dione 21-acetate and 6.0 g. of potassium fluoride in 40 ml. of diethylacetic acid and 20 ml. of tetrahydrofuran is reacted with 0.395 g. of N-bromoacetamide and the crude product isolated in the manner described in Example 3. The crude product is then chromatographed on silica gel, and the fraction eluted with 40% ether-hexane is crystallized from acetone-hexane to yield 9α-bromo-11β-fluoro-4-pregnene-17α,21-diol-3,20-dione 21-acetate;

$$\lambda_{max}^{MeOH}\ 243\ m\mu$$

The corresponding 21-alcohol is prepared from the above prepared 21-acetate in the manner of Example 4, to give 9α-bromo-11β-fluoro-4-pregnene-17α,21-diol-3,20-dione.

EXAMPLE 17

*9α,11β-dichloro-4-pregnene-16α,17α,21-triol-3,20-dione 16α,21-diacetate*

Five grams of 4,9(11)-pregnadiene-16α,17α,21-triol-3,20-dione 16α,21-diacetate are reacted with 1.5 grams of N-chlorosuccinimide in the manner of Example 2. The crude reaction product is crystallized from methanol to yield 9α,11β-dichloro-4-pregnene-16α,17α,21-triol-3,20-dione 16α,21-diacetate, $$\lambda_{max}^{MeOH}\ 240\ m\mu$$

EXAMPLE 18

*1,4,9(11)-pregnatriene-16α,17α,21-triol-3,20-dione 16α,21-diacetate*

Five grams of 1,4-pregnadiene-11β-16α,17α,21 tetrol-3,20-dione 16α,21-diacetate are dissolved in 20 ml. of dry dimethylformamide and 4 ml. of dry pyridine. The solution is chilled in an ice bath and to it is added dropwise 2.85 grams of methanesulfonylchloride which has been diluted to 30 ml. with dimethylformamide. After the addition has been completed, stirring is continued at room temperature for 48 hours. The reaction mixture is then poured into cold, dilute sulfuric acid, and the precipitated substance is filtered, air-dried, and crystallized from methanol to yield 1,4,9(11)-pregnatriene-16α,17α,21-triol-3,20-dione 16α,21-diacetate, $$\lambda_{max}^{MeOH}\ 238\ m\mu$$

EXAMPLE 19

*9α-chloro-11β-fluoro-1,4-pregnadiene-16α,17α,21-triol-3,20-dione 16,21-diacetate*

Five grams of 1,4,9(11)-pregnatriene-16α,17α,21-triol-3,20-dione 16,21-diacetate, prepared as described in Example 18, is reacted with 1.52 g. of N-chloro-succinimide and 6 g. of potassium fluoride in the manner of Example 11.

The crude product is isolated, chromatographed, and crystallized from methylene chloride-hexane to give 9α-chloro - 11β-fluoro-1,4-pregnadiene-16α,17α,21-triol-3,20-dione 16,21-diacetate $$\lambda_{max}^{MeOH}\ 237\ m\mu$$

EXAMPLE 20

*16β-methyl-1,4,9(11)-pregnatriene-17α,21-diol-3,20-dione 21-acetate*

The requisite intermediate, 16β-methyl-1,4-pregnadiene-11β,17α,21-triol-3,20-dione 21-acetate is prepared from 16-pregnene-3α-ol-11,20-dione 3-acetate in the manner described in co-pending application, Serial No. 673,141 of Richard Rausser et al., filed July 22, 1957.

16β - methyl - 1,4 - pregnadiene-11β,17α,21-triol-3,20-dione 21-acetate (5 g.) is then reacted with methanesulfonyl chloride (3.05 g.), and the resultant crude product isolated in the manner described in Example 18. The crude product is then crystallized from methylene chloride-hexane to give 16β-methyl-1,4,9(11)-pregnatriene-17α,21-diol-3,20-dione 21-acetate $$\lambda_{max}^{MeOH}\ 238\ m\mu$$

EXAMPLE 21

*9α,11β-dichloro-16β-methyl-1,4-pregnadiene-17α,21-diol-3,20-dione 21-acetate*

One gram of the 16β-methyl-1,4,9(11)-pregnatriene prepared in above Example 20 is reacted with 0.34 gram of N-chloro-succinimide in the manner of Example 2. The crude residue is isolated in the manner described and then crystallized from methanol to give 9α,11β-dichloro-16β - methyl-1,4-pregnadiene-17α,21-diol-3,20-dione 21-acetate $$\lambda_{max}^{MeOH}\ 237\ m\mu$$

The corresponding 21-alcohol of the 21-acetate of this example is prepared in the manner of Example 4, to give 9α,11β - dichloro-16β-methyl-1,4-pregnadiene-17α,21-diol-3,20-dione.

EXAMPLE 22

*9α-chloro-11β-fluoro-16β-methyl-1,4-pregnadiene-17α,21-diol-3,20-dione 21-acetate*

One gram of 16β-methyl-1,4,9(11)-pregnatriene-17α,21-diol-3,20-dione 21-acetate prepared as in Example 20 is reacted with 0.34 g. of N-chloro succinimide and 6 g. of potassium fluoride in the manner described in Example 11. The crude product which is isolated is crystallized from methylenechloride to give 9α-chloro-11β-fluoro-16β-methyl-1,4-pregnadiene-17α,21-diol-3,20-dione 21-acetate $$\lambda_{max}^{MeOH}\ 237\ m\mu$$

EXAMPLE 23

*6α-methyl-1,4,9(11)-pregnatriene-17α,21-diol-3,20-dione 21-acetate*

6α - methyl-1,4-pregnadiene-11β,17α,21-triol-3,20-dione 21-acetate (5 g.) and methanesulfonyl chloride (3.05 g.) are reacted in the manner of above Example 20 to yield a product which is crystallized from methanol to give 6α - methyl-1,4,9(11)-pregnatriene-17α,21-diol-3,20-dione 21-acetate $$\lambda_{max}^{MeOH}\ 240\ m\mu$$

EXAMPLE 24

*9α,11β-dichloro-6α-methyl-1,4-pregnadiene-17α,21-diol-3,20-dione 21-acetate*

6α - methyl - 1,4,9(11) - pregnatriene - 17α,21-diol-3,20-dione 21-acetate (1 g.), prepared as in Example 23, and N-chlorosuccinimide (0.34 g.) are reacted in the manner of Example 2 to yield 9α,11β-dichloro-6α-methyl-1,4-pregnadiene-17α,21-diol-3,20-dione 21-acetate, which is crystallized from methylene chloride-ether $\lambda_{max}^{MeOH}$ 239 mμ

EXAMPLE 25

*9α-chloro-11β-fluoro-6α-methyl-1,4-pregnadiene-17α,21-diol-3,20-dione 21-acetate*

6α - methyl - 1,4,9(11)-pregnatriene-17α,21-diol-3,20-dione 21-acetate (1 g.), prepared as in Example 23, is reacted with N-chlorosuccinimide (0.34 g.) and potassium fluoride (6 g.) in the manner of Example 11 to yield 9α - chloro-11β-fluoro-6α-methyl-1,4-pregnadiene-17α,21-diol-3,20-dione 21-acetate, which is crystallized from acetone-hexane $\lambda_{max}^{MeOH}$ 239 mμ

EXAMPLE 26

*2-methyl-4,9(11)-pregnadiene-17α,21-diol-3,20-dione-21-acetate*

Five grams of 2-methylhydrocortisone 21-acetate is reacted with 3.05 grams of methanesulfonyl chloride in the manner described in Example 18. The crude product so obtained is crystallized from acetone-methanol to yield 2-methyl-4,9(11)-pregnadiene-17α,21-diol-3,20-dione 21-acetate $\lambda_{max}^{MeOH}$ 239 mμ

EXAMPLE 27

*2-methyl-9α,11β-dichloro-4-pregnene-17α,21-diol-3,20-dione 21-acetate*

2 - methyl-4,9(11)-pregnadiene-17α,21-diol-3,20-dione 21-acetate (1 g.), prepared as in above Example 26, is reacted with N-chlorosuccinimide (0.34 g.) in the manner of Example 2. The crude product so obtained is crystallized from acetone-hexane to give 2-methyl-9α,11β-dichloro-4-pregnene-17α,21-diol-3,20-dione 21-acetate $\lambda_{max}^{MeOH}$ 238 mμ

EXAMPLE 28

*2-methyl-9α-chloro-11β-fluoro-4-pregnene-17α,21-diol-3,20-dione 21-acetate*

2 - methyl-4,9(11)-pregnadiene-17α,21-diol-3,20-dione 21-acetate (1 g.), prepared as in above Example 26, is reacted with N-chlorosuccinimide (0.34 g.) and potassium fluoride (6 g.) in the manner of Example 11. The crude product so obtained is crystallized from acetone-hexane to give 2-methyl-9α-chloro-11β-fluoro-4-pregnene-17α,21-diol-3,20-dione 21-acetate $\lambda_{max}^{MeOH}$ 238 mμ

The 21-acetate of this example is converted to the corresponding 21-alcohol in the manner of Example 4, to yield 2-methyl-9α-chloro-11β-fluoro-4-pregnene-17α,21-diol-3,20-dione.

EXAMPLE 29

*9α-bromo-11β-chloro-1,4-pregnadiene-17α,21-diol-3,20-dione*

9α-bromo-11β-chloro-1,4-pregnadiene-17α,21-diol-3,20-dione 21-acetate, prepared as in Example 1, in 3:1 methanol-chloroform is hydrolyzed with 0.1 N-sodium hydroxide solution in the manner of Example 4 to give 9α-bromo-11β-chloro-1,4-pregnadiene-17α,21-diol-3,20-dione, $[\alpha]_D^{25}$ +142° (pyridine);

$\lambda_{max}^{MeOH}$ 240 mμ, ε=13,400

*Analysis.*—Calcd. for $C_{21}H_{26}O_4BrCl$: C, 55.09; H, 5.73; Cl, 7.74; Br, 17.46. Found: C, 55.05; H, 5.89; Cl. 7.88; Br, 17.31.

EXAMPLE 30

*9α-bromo-11β-chloro-16α-ethyl-1,4-pregnadiene-17α,21-diol-3,20-dione*

A. 16α-METHYL-1,4,9(11)-PREGNATRIENE-17α,21-DIOL-3,20-DIONE 21-ACETATE

The requisite intermediate, 16α-methyl-1,4-pregnadiene-11β,17α,21-triol-3,20-dione 21-acetate, is prepared from 16-pregnene-3α-ol-11,20-dione in the manner described in copending application, Serial No. 733,843 of Richard Rausser et al., filed May 8, 1958.

16α-methyl-1,4-pregnadiene-11β,17α,21-triol-3,20-dione 21-acetate (0.3 g.) is dissolved in 2 ml. of pyridine and there is added 0.1 ml. of methane-sulfonyl chloride in 2 ml. of pyridine. The solution is allowed to stand for five hours, then is poured into ice-hydrochloric acid. The solid which precipitates is filtered, washed with water, then recrystallized from acetone to give 16α-methyl-1,4,9(11)-pregnatriene-17α,21-diol-3,20-dione 21-acetate, $\lambda_{max}^{MeOH}$ 238 mμ (ε 15,200)

B. 9α,11β-DICHLORO-16α-METHYL-1,4-PREGNADIENE-17α,21-DIOL-3,20-DIONE 21-ACETATE

One gram of the 16α-methyl-1,4,9(11)-pregnatriene, prepared as in above Example 30A, is reacted with 0.34 gram of N-chlorosuccinimide in the manner of Example 2 and the product isolated and purified in the described manner to give 9α,11β-dichloro-16α-methyl-1,4-pregnadiene-17α,21-diol-3,20-dione 21-acetate.

C. 9α,11β-DICHLORO-16α-METHYL-1,4-PREGNADIENE-17α,21-DIOL-3,20-DIONE

A mixture of 0.5 g. of 9α,11β-dichloro-16α-methyl-1,4-pregnadiene, 17α,21-diol-3,20-dione 21-acetate, prepared as in above Example 30B, in 100 ml. of methanol, 20 ml. of chloroform, 5 ml. of water and 5 ml. of concentrated hydrochloric acid is allowed to stand 48 hours at room temperature. Water is then added, and the mixture extracted with methylene chloride. The organic extracts are washed with water, dried and concentrated to a residue. Crystallization of this residue from acetone yields 9α,11β-dichloro-16α-methyl-1,4-pregnadiene-17α,21-diol-3,20-dione.

EXAMPLE 31

*9α-bromo-11β-chloro-16α-ethyl-1,4-pregnadiene-17α,21-diol-3,20-dione*

A. 16α-ETHYL-1,4,9(11)-PREGNATRIENE-17α,21-DIOL-3,20-DIONE 21-ACETATE

The requisite intermediate, 16α-ethyl-1,4-pregnadiene-11β,17α,21-triol-3,20-dione 21-acetate, is prepared from 16-pregnene-3α-ol-11,20-dione in the manner described in copending application, Serial No. 733,843 of Richard Rausser et al., filed May 8, 1958.

16α-ethyl-1,4-pregnadiene-11β,17α,21-triol - 3,20 - dione 21-acetate is reacted with methane-sulfonyl chloride in the manner described in Example 30A to give 16α-ethyl-1,4,9(11)-pregnatriene-17α,21-diol-3,20-dione 21-acetate.

B. 9α-BROMO-11β-CHLORO-16α-ETHYL-1,4-PREGNADIENE-17α,21-DIOL-3,20-DIONE 21-ACETATE

To a solution of one gram of the 16α-ethyl-1,4,9(11)-pregnatriene of above Example 31A and 5 grams of lithium chloride in 40 ml. of glacial acetic acid there is added 0.395 g. of N-bromoacetamide. The reaction mixture is stirred at room temperature for two hours, then poured into ice-water. The mixture is filtered, and the precipitate washed with water to yield 1.18 grams of the crude substance of this example. Recrystallization from acetone yields 9α-bromo-11β-chloro-16α-ethyl-1,4-pregnadiene-17α,21-diol-3,20-dione 21-acetate.

C. 9α-BROMO-11β-CHLORO-16α-ETHYL-1,4-PREGNADIENE-17α,21-DIOL-3,20-DIONE

The 21-acetate of above Example 31B is hydrolyzed with methanol-chloroform-aqueous hydrochloric acid as

13 described in Example 30C, to yield 9α-bromo-11β-chloro-16α-ethyl-1,4-pregnadiene-17α,21-diol-3,20-dione.

EXAMPLE 32

*9α,11β-dichloro-16α-ethyl-4-pregnene-17α,21-diol-3,20-dione*

A. 16α-ETHYL-4,9(11)-PREGNADIENE-17α,21-DIOL-3,20-DIONE 21-ACETATE

The requisite intermediate, 16α-ethyl-4-pregnene-11β,17α,21-triol-3,20-dione is prepared from 16-pregnene-3α-ol-11,20-dione in the manner described in copending application Serial No. 733,843 of Richard Rausser et al., filed May 8, 1958. The corresponding 21-acetate is formed by dissolving the 16α-ethyl-4-pregnene-21-ol- prepared above (100 mg.) in 2 ml. of pyridine containing 100 mg. of acetic anhydride and allowing the solution to stand at room temperature for one hour. The reaction mixture is poured into ice and hydrochloric acid, and a solid precipitates which is filtered and crystallized from aqueous methanol to yield 16α-ethyl-4-pregnene-11β,17α,21-triol-3,20-dione 21-acetate.

16α-ethyl-4-pregnene-11β,17α,21-triol-3,20-dione 21-acetate is reacted with methane-sulfonyl chloride in pyridine in the manner described in Example 30A to yield 16α-ethyl-4,9(11)-pregnadiene-17α,21-diol-3,20-dione 21-acetate.

B. 9α-11β-DICHLORO-16α-ETHYL-4-PREGNENE-17α,21-DIOL-3,20-DIONE 21-ACETATE

16α-ethyl-4,9(11)-pregnadiene-17α,21-diol-3,20-dione 21-acetate (5 g.) and p-iodotoluene dichloride (4.2 g.) are dissolved in 100 ml. of methylene chloride. The solution is stirred for four hours at room temperature, then concentrated in vacuo to a residue which is recrystalized from acetone-hexane to give 9α,11β-dichloro-16α-ethyl-4-pregnene-17α,21-diol-3,20-dione 21-acetate (4 g.).

C. 9α,11β-DICHLORO-16α-ETHYL-4-PREGNENE-17α,21-DIOL-3,20-DIONE

The 21-acetate of above Example 32B is hydrolyzed with methanol-chloroform-aqueous hydrochloric acid as described in Example 30C to yield 9α,11β-dichloro-16α-ethyl-4-pregnene-17α,21-diol-3,20-dione.

EXAMPLE 33

*9α,11β-dichloro-4-pregnene-17α,21-diol-3,20-dione 21-hemisuccinate*

9α,11β-dichloro-4-pregnene-17α,21-diol-3,20-dione (5 g.) prepared as in Example 15, is dissolved in pyridine (100 ml.) and succinic anhydride (5 g.) added. The reaction mixture is stirred 20 hours at room temperature, then is diluted with ice water and acidified with cold, dilute sulfuric acid. The precipitate which forms is filtered, washed with water, dried, and crystallized with acetone-water to yield 9α,11β-dichloro-4-pregnene-17α,21-diol-3-20-dione 21-hemisuccinate.

A sample of the free acid-ester obtained above is then covered with water and titrated to pH 7.1 with dilute sodium hydroxide. The solution is evaporated to a residue which is recrystallized from aqueous acetonitrile to give the sodium salt of 9α,11β-dichloro-4-pregene-17α,21-diol-3,20-dione 21-hemisuccinate.

EXAMPLE 34

*9α,11β-dichloro-1,4-pregnadiene-17α,21-diol-3,20-dione 21-hemisuccinate*

In the manner described in Example 33, 9α,11β-dichloro-1,4-pregnadiene-17α,21-diol-3,20-dione, prepared as in Example 5, is reacted with succinic anhydride to give 9α,11β-dichloro-1,4-pregnadiene-17α,21-diol-3,20-dione 21-hemisuccinate.

The sodium salt of the above 1,4-pregnadiene hemisuccinate is prepared in the manner of Example 33.

EXAMPLE 35

*9α,11β-dichloro-1,4-pregnadiene-17α,21-diol-3,20-dione 21-t-butylacetate*

9α,11β-dichloro-1,4-pregnadiene-17α,21-diol-3,20-dione (5 g.), prepared as in Example 5, is dissolved in 100 ml. of pyridine, the solution is cooled to below 10° C., and tertiary butylacetylchloride (1.5 g.) added. The mixture is stirred at room temperature for 16 hours, then poured into cold, dilute, sulfuric acid. The precipitate which forms is filtered, washed with water, and crystallized from acetone to give 9α,11β-dichloro-1,4-pregnadiene-17α,21-diol-3,20-dione 21-t-butylacetate.

EXAMPLE 36

*9α,11β-dichloro-1,4-pregnadiene-17α,21-diol-3,20-dione 21-phosphate*

A. 1,4,9(11)-PREGNATRIENE-17α,21-DIOL-3,20-DIONE 21-PHOSPHATE

To a solution of 1 gram of 1,4-prenadiene-11β,17α,21-triol-3,20-dione 21-phosphate in 40 ml. of glacial acetic acid there is added, under an atmosphere of nitrogen, 8 ml. of 5.5 N-anhydrous hydrogen bromide in glacial HCl dissolved in 2.5 ml. of tetrahydrofuran. The reacetic acid. The solution is allowed to stand at room temperature for twenty minutes and then is evaporated in vacuo to a residue substantially of 1,4,9(11)-pregnatriene-17α,21-diol-3,20-dione 21-phosphate which is used without further purification in the reaction immediately following.

B. 9α,11β-DICHLORO-1,4-PREGNADIENE-17α,21-DIOL-3,20-DIONE 21-PHOSPHATE

One gram of the pregnatriene 21-phosphate of above Example 36A is dissolved in 40 ml. of glacial acetic acid and there is added 200 mg. of anhydrous chlorine in 5 ml. of tetrahydrofuran followed by 100 mg. of anhydrous HCl dissolved in 2.5 ml. of tetrahydrofuran. The reaction mixture is stirred for 2 hours at 5–10° C., then is concentrated to dryness in vacuo at a temperature below 10° C., to give a residue substantially of 9α,11β-dichloro-1,4-pregnadiene-17α,21-diol-3,20-dione 21-phosphate.

EXAMPLE 37

*9α,11β-dichloro-6α-methyl-1,4-pregnadiene-17α,21-diol-3,20-dione*

9α,11β - dichloro - 6α - methyl - 1,4 - pregnadiene-17α,21-diol-3,20-dione 21-acetate, prepared as in Example 24, is hydrolyzed in methanol-chloroform with dilute sodium hydroxide in the manner described in Example 4 to yield 9α,11β-dichloro-6α-methyl-1,4-pregnadiene-17α,21-diol-3,20-dione.

We claim:
1. Compounds of the group consisting of 17α,21-dihydroxy-3,20-diketo-9,11-dihalogeno pregnenes and pregnadienes having the following respective formulae:

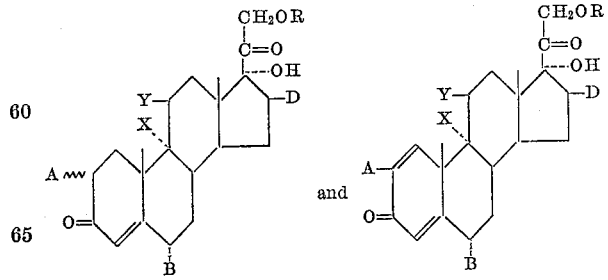

wherein X is a halogen having an atomic weight greater than 19, Y is a halogen having an atomic weight less than 126 and being at least as electronegative as X, R is a member of the group consisting of hydrogen and acid radicals of the group consisting of hydrocarbon monocarboxylic acids having up to 8 carbon atoms, dibasic organic acids having up to 8 carbon atoms, sulfate and phosphate, A and B are members of the group consisting of H and methyl and D is a member of the group consisting of H, α-lower alkyl, β-lower alkyl, α-hydroxy and α-lower alkanoyloxy, at least two of A, B and D being H.

2. The 21-acylates of 9α-X-11β-Y-4-pregnene-17α,21-diol-3,20-dione, wherein X is a halogen having an atomic weight greater than 19 and Y is a halogen having an atomic weight less than 126 and being at least as electronegative as X, and the acyl group is that of a hydrocarbon monocarboxylic acid containing up to 8 carbon atoms.

3. 9α - X - 11β - Y - 1,4 - pregnadiene - 17α,21 - diol-3,20-dione wherein X is a halogen having an atomic weight greater than 19 and Y is a halogen having an atomic weight less than 126 and being at least as electronegative as X.

4. The 21-acylates of 9α-X-11β-Y-1,4-pregnadiene-17α,21-diol-3,20-dione wherein X is a halogen having an atomic weight greater than 19 and Y is a halogen having an atomic weight less than 126 and being at least as electronegative as X, and the acyl group is that of a hydrocarbon monocarboxylic acid containing up to 8 carbon atoms.

5. The 21-hemiesters of 9α-X-11β-Y-1,4-pregnadiene-17α,21-diol-3,20-dione wherein X is a halogen having an atomic weight greater than 19 and Y is a halogen having an atomic weight less than 126 and being at least as electronegative as X, and wherein the acyl component of the ester is an acid radical of a dibasic organic acid having up to eight carbon atoms.

6. 6α - methyl - 9α - X - 11β - Y - 1,4-pregnadiene-17α, 21-diol-3,20-dione, wherein X is a halogen having an atomic weight greater than 19 and Y is a halogen having an atomic weight less than 126 and being at least as electronegative as X.

7. The 21-acylates of 6α-methyl-9α-X-11β-Y-1,4-pregnadiene-17α,21-diol-3,20-dione wherein X is a halogen having an atomic weight greater than 19 and Y is a halogen having an atomic weight less than 126 and being at least as electronegative as X, and the acyl group is that of a hydrocarbon monocarboxylic acid containing up to 8 carbon atoms.

8. 16-lower alkyl-9α-X-11β-Y-4-pregnene-17α,21-diol-3,20-dione, wherein X is a halogen having an atomic weight greater than 19 and Y is a halogen having an atomic weight less than 126 and being at least as electronegative as X.

9. The 21-acylates of 16-lower alkyl-9α-X-11β-Y-4-pregnene-17α,21-diol-2,20-dione, wherein X is a halogen having an atomic weight greater than 19 and Y is a halogen having an atomic weight less than 126 and being at least as electronegative as X, and the acyl group is that of a hydrocarbon monocarboxylic acid containing up to 8 carbon atoms.

10. 16-lower alkyl-9α-X-11β-Y-1,4-pregnadiene-17α,21-diol-3,20-dione, wherein X is a halogen having an atomic weight greater than 19 and Y is a halogen having an atomic weight less than 126 and being at least as electronegative as X.

11. The 21-acylates of 16-lower alkyl-9α-X-11β-Y-1,4-pregnadiene-17α,2-diol-3,20-dione, wherein X is a halogen having an atomic weight greater than 19 and Y is a halogen having an atomic weight less than 126 and being at least as electronegative as X, and the acyl group is that of a hydrocarbon monocarboxylic acid containing up to 8 carbon atoms.

12. The 16,21-diacylates of 9α-X-11β-Y-1,4-pregnadiene-16α,17α,21-triol-3,20-dione, wherein X is a halogen having an atomic weight greater than 19 and Y is a halogen having an atomic weight less than 126 and being at lease as electronegative as X, and the acyl group is that of a hydrocarbon monocarboxylic acid containing up to 8 carbon atoms.

13. 9α,11β - dichloro - 1,4 - pregnadiene - 17α,21 - diol-3,20-dione.

14. 9α,11β - dichloro - 1,4 - pregnadiene - 17α,21 - diol-3,20-dione 21-acetate.

15. 9α,11β - dichloro - 1,4 - pregnadiene - 17α,21 - diol-3,20-dione 21-phosphate.

16. 9α,11β - dichloro - 1,4 - pregnadiene - 17α,21 - diol-3,20-dione 21-hemisuccinate.

17. 9α,11β - dichloro - 1,4 - pregnadiene - 17α,21 - diol-3,20-dione 21-carbethoxylate.

18. 6α - methyl - 9α,11β - dichloro - 1,4 - pregnadiene-17α,21-diol-3,20-dione.

19. 16α - methyl - 9α,11β - dichloro - 1,4 - pregnadiene-17α,21-diol-3,20-dione.

20. 16β - methyl - 9α,11β - dichloro - 1,4 - pregnadiene-17α,21-diol-3,20-dione.

21. 9α,11β - dichloro - 4 - pregnene - 17α,21-diol-3,20-dione 21-acetate.

References Cited in the file of this patent
UNITED STATES PATENTS

| | | |
|---|---|---|
| 2,387,706 | Reichstein | Oct. 23, 1945 |
| 2,401,775 | Reichstein | June 11, 1946 |
| 2,409,798 | Reichstein | Oct. 22, 1946 |
| 2,837,515 | Chemerda et al. | June 3, 1958 |
| 2,865,935 | Schneider et al. | Dec. 22, 1958 |

OTHER REFERENCES

Handbook of Chemistry and Physics, 35th edition (Cleveland: Chemical Rubber Pub. Co., 1953), page 369 necessary.